United States Patent [19]

Hirosawa et al.

[11] Patent Number: 4,966,714
[45] Date of Patent: Oct. 30, 1990

[54] PROCESS FOR TREATING WASTE WATER

[75] Inventors: Kouzou Hirosawa; Yukio Kanazawa, both of Ube, Japan

[73] Assignee: Ube Industries, Ltd., Ube, Japan

[21] Appl. No.: 423,339

[22] Filed: Oct. 18, 1989

[30] Foreign Application Priority Data

Oct. 21, 1988 [JP] Japan .................. 63-263900

[51] Int. Cl.$^5$ .............................................. C02F 1/52
[52] U.S. Cl. ..................... 210/708; 210/716; 210/723; 210/908
[58] Field of Search ............... 210/708, 716, 723, 726, 210/908, 702

[56] References Cited

U.S. PATENT DOCUMENTS

| | | | |
|---|---|---|---|
| 3,446,731 | 5/1969 | Harsh | 210/708 |
| 4,564,464 | 1/1986 | Harpel et al. | 210/723 |
| 4,707,270 | 11/1987 | Kobayashi et al. | 210/723 |
| 4,765,908 | 8/1988 | Monick et al. | 210/913 |

FOREIGN PATENT DOCUMENTS

| | | | |
|---|---|---|---|
| 1298133 | 5/1962 | France | 210/716 |
| 4959791 | 10/1972 | Japan | 210/716 |
| 6128491 | 7/1984 | Japan | 210/716 |
| 7201907 | 8/1972 | Netherlands | 210/716 |

Primary Examiner—Peter Hruskoci
Assistant Examiner—Krisanne Shideler
Attorney, Agent, or Firm—Flynn, Thiel, Boutell & Tanis

[57] ABSTRACT

A process is disclosed for treating waste water which comprises the steps of adding thermal decomposition product consisting of CaO-MgO-SiO$_2$ system compound singly or in combination with at least a metal salt selected from the group consisting of iron salts and magnesium salts to waste water containing an emulsion or a latex, thereby causing coagulation and sedimentation of particles consisting mainly of resin existing in the waste water and then removing the coagulated particles.

14 Claims, 1 Drawing Sheet

PROCESS FOR TREATING WASTE WATER

BACKGROUND OF THE INVENTION

1. Field of the Invention

The present invention relates to a process for treating waste water resulting from the preparation or use of emulsions and latexes which have been increasingly used with developments in various industrial fields of textiles, paints, papers, adhesives, synthetic resins, rubbers, etc.

2. Description of the Prior Art

In recent years, large quantities of emulsions and latexes have been used with industrial developments in textiles, paints, papers, adhesives, synthetic resins, rubbers or the like.

The waste water resulting from the preparation, storage, transportation, mixing, processing, use and other operations of these emulsions or latexes is turbid white. Further, large quantities of water are employed to remove the emulsions and latexes adhering onto or remaining in apparatuses, vessels, pipes or the like which are used in the above operations and processes and large quantities of turbid white waste water are produced, although the degree of the turbidity may vary depending on the concentration of the emulsion or latex.

Furthermore, in some cases, the emulsion or latex remaining in or adhering on the facilities, vessels, pipes, etc., can not be completely removed only by washing with water depending on the kind thereof.

In the foregoing emulsion or latex, an emulsifier which is a kind of surfactant, and synthetic or natural high polymers are dispersed in the form of very fine particles of a size as small as a few microns or less. When the waste water containing such an emulsion or latex is discharged into the environment without any treatment, serious water pollution problems will occur. Therefore, in order to prevent such water pollution problems, it is urgently requested to establish treating techniques for purification of the above-mentioned waste water.

As known methods for treating such a waste water containing such an emulsion or latex, there have been usually employed dilution, coagulating sedimentation, electrolytic process, incineration, pressure floating, activated sludge process, etc.

For example, in the dilution process, large quantities of water are employed to dilute the waste water and, if necessary, small amounts of acid or alkali is added to the waste water. This process is effective only for clarification of the turbid waste water but it is entirely ineffective for the removal of emulsifiers and synthetic high polymeric materials dispersed in the waste water. When the waste water is discharged in such a polluted state, the emulsifier and synthetic high polymeric materials increase the chemical oxygen demand (hereinafter, referred to as "COD") of waste water and cause a considerable water pollution.

In view of the foregoing, there may be proposed, for example, the following waste water treatments.

In Japanese patent application laid-open No. 50-117 687, bentonite and an inorganic coagulant are added to waste water, and then an organic coagulant is added. Japanese patent publication No. 51-44 343 discloses the use of a certain kind of an aqueous dispersant having cationic charge. As a further waste water treatment, in Japanese patent publication No. 52-9 558, a latex containing waste water is adjusted to a certain pH value, the resin constituent is removed and an inorganic precipitant is added under agitation by air to cause formation of flocks and then sedimentation of the formed flocks. However, none of these known methods can give a satisfactory result.

When known inorganic or high polymeric coagulants are added to the above-mentioned waste water in order to remove the dispersed resin constituents of high polymers and emulsifer, some problems arise in the removal operation. For instance, when inorganic coagulants containing Al or Fe compounds are used, formation of flocks takes place on aluminum ions or iron ions as nuclei but it does not take place in some latexes or emulsions. Further, in some cases, the cohesive force of the resultant flocks is weak. Therefore, separation of the flocks may be difficult. On the other hand, known organic coagulants are also unsatisfactory. For example, when high polymer coagulants, which are oppositely charged relative to the emulsion or latex to be treated are added to cause decomposition of the emulsion or latex, the resin component may be separated and removed from the waste water. However, even if the resin component can be removed, it is difficult to satisfactorily remove an emulsifier as a surfactant and the added high polymer coagulants remaining in the water.

In known waste water treatments, inorganic coagulants, such as aluminum sulfate, polyaluminum chloride, ferric chloride, etc., and organic high polymer coagulants, such as polyacrylic amide, modified products of polyacrylic acid, etc., have been employed. It is desired to use these coagulants more effectively, slaked lime (calcium hydroxide), soda ash, fly ash or the like has been additionally employed. However, since the particles of emulsion or latex existing in the waste water, which is contemplated to be purified by the present invention, can the very stably dispersed in the waste water, the sedimentation of the particles coagulated by the above-mentioned known coagulants is slow and it is difficult to achieve sufficient water purification in a short processing time.

Consequently, the COD, which is a measure established for waste water purification, can not be reduced to permissible levels. Particularly, when a phosphoric ester which is added as a surfactant to establish a stably dispersed emulsion or latex, is present in waste water, the emulsion or latex can scarcely be removed by addition of known inorganic or high polymer coagulants. Therefore, when the treated waste water is discarded without being subjected to further treatments, it will accelerate eutrophication in closed water areas which has been presented serious problems in recent years.

High polymer coagulants are generally expensive and some of them exhibit toxicity when they are discharged into rivers.

In treating the waste water containing the emulsion or latex as mentioned above, if only the resin constituents are removed, a satisfactory purification can not be achieved. The COD constituents and phosphorus constituents should be also simultaneously removed.

When the foregoing waste water containing emulsion or latex is treated by an activated sludge process using micro-organisms, prolonged retention time and large-sized equipment are required to decompose almost completely the resin and surfactant constituents. As a further disadvantage, the process can not be employed in waste waters which contain an emulsion or latex having toxic constituents in high contents because of its high toxicity. Further, when the aeration of the activated sludge process involves generation of bad odors, there are risks of secondary environmental pollution. Usually, the activated sludge process gives large amounts of sludge and high moisture contents and presents difficulties in treating the sludge.

Since the waste water containing emulsion or latex is usually free from toxic heavy metals, attention has been devoted to the treatment of such a type of waste water and no noteworthy proposal has been presented up to now. However, actually, the waste water has a high COD far beyond the permissible levels and, therefore, when the waste water is discharged into sewers and rivers, it causes serious pollution problems and deterious effects on the growth of plants and fish.

The waste water treated in the present invention is more specifically described below.

The emulsions or latexes contained in the waste water have been widely used in various industries, such as textile, paint, paper, adhesive, synthetic resin, rubber, etc., and the resin, as a main constituent, and as another constituent, an emulsifier, which is a kind of surfactant used for the preparation of emulsions or latexes, are dispersed in the mother liquid in the form of very fine particles, for example, about 0.1 to 5 $\mu$m in particle diameter. Also, when the emulsifier is diluted with water, it may be dispersed in the particle form in the waste water without any change. When the dispersed particles consisting mainly of resin have a density near the density of water and hydration fully occurs on the surfaces of the particles, the particles can not be easily coagulated and most of such hydrated particles will pass through the filter employed in the filtering device, without being separated from the mother liquid. Therefore, it is very difficult to efficiently separate the dispersed particles.

SUMMARY OF THE INVENTION

It is, accordingly, an object of the present invention to provide a novel treatment process for purification of waste water including emulsions and/or latexes in which the resin constituents, the COD constituents, the emulsifier and other constituents are dispersed as fine particles. More specifically, it is an object of the present invention to facilitate the removal of the dispersed fine particles, which can not be easily separated by known treatments, and thereby purify the waste water to acceptable levels.

In view of the objects of the present invention, there is provided a process for treating waste water which comprises the steps of:

adding a thermal decomposition product consisting of $CaO-MgO-SiO_2$ system compound to waste water containing one or more of the emulsions and/or latexes, thereby causing coagulation and sedimentation of particles consisting mainly of resin existing in the waste water; and then removing the coagulated particles.

In the waste water treatment set forth above, the thermal decomposition product consisting of $CaO-MgO-SiO_2$ system compound may be added in combination with at least one metal salt selected from the group consisting of iron salts and magnesium salts.

In accordance with the present invention, the thermal decomposition product consisting of $CaO-MgO-SiO_2$ system compound or a mixture of this thermal decomposition product and at least one metal salt selected from iron salts and magnesium salts is added as a waste water treating agent, under stirring, into the waste water including one or more emulsions and/or latexes.

In the waste water, various fine particles which can not be easily separated are dispersed. The addition of the waste water treating agent causes the coagulation and association of such dispersed particles, thereby forming large particles on the treating agent as nuclei. In such a procedure, the resin constituent which is a main component of the emulsion or latex, and other undesirable components can be readily removed by sedimentation, filtration, etc.

DETAILED DESCRIPTION OF THE PREFERRED EMBODIMENTS

The present Inventors have made various extensive studies to obtain an economical, simple and practical process of for treating waste water including one or more emulsions and/or latexes and found that when a certain thermal decomposition product consisting of $CaO-MgO-SiO_2$ system compound, or a mixture of the $CaO-MgO-SiO_2$ system compound and at least a metal salt selected from the group consisting of iron salts and magnesium salts, is added, as a waste water treating agent into the waste water, the dispersed resin constituents are coagulated and removed. As a result, the turbid white waste water can be easily purified to a colorless, clear liquid and, at the same time, the COD and phosphorus constituents can be considerably reduced. Further, nitrogen compounds can be removed. The present invention has been accomplished based on these findings.

The waste water, which can be successfully purified by the present invention contains one or more emulsions and/or latexes as set forth below, namely vinyl acetate emulsion, acrylic ester emulsion, styrene emulsion, chloroprene latex, ethylene-vinyl acetate emulsion, urethane emulsion, butadiene latex, vinyl chloride emulsion, acrylonitrile emulsion, styrene-butadiene latex, acrylonirrile-butadiene latex, acrylonitrile-styrene emulsion, acrylonitrile-butadiene-styrene latex, styrene-acrylic ester-vinyl acetate emulsion and natural rubber latex.

Also, in the above emulsions or latexes, styrene may be partially replaced with $\alpha$-methylstyrene. Waste water containing such emulsions or latexes can also be treated by the process of the present invention.

The preparation of the thermal decomposition product consisting of $CaO-MgO-SiO_2$ system compound used in the present invention is specifically described below.

As source materials which yield the $CaO-MgO-SiO_2$ system compound upon thermal decomposition, there may be exemplified substances consisting mainly of CaO, such as calcium carbonate or slaked lime (calcium hydroxide); substances consisting mainly of MgO, such as magnesium carbonate, magnesium hydroxide or serpentine; substances consisting mainly of CaO and MgO, such as dolomite; or substances consisting mainly of $SiO_2$, such as silica, fly ash or blast furnace slag.

The source materials are mixed and heated at temperatures in the range of 700° C. to 1000° C. The source materials should be mixed in proportions such that the thermal decomposition product, at the heating temperature has a composition satisfying the following relationships.

CaO/MgO (weight ratio) > 1,

MgO/SiO$_2$ (weight ratio) > 1 and

CaO+MgO+SiO$_2$ > 80 weight %, preferably

CaO/MgO (weight ratio) > 1.2,

MgO/SiO$_2$ (weight ratio) > 1.2 and

CaO+Mg+SiO$_2$ > 90 weight %.

The heating time needed for the thermal decomposition varies depending on the heating temperature. For example, when the heating temperature is 700° C., at least one hour is needed. The resulting thermal decomposition product is ground to a particle size of not greater than 149 μm using a grinding device. The product thus obtained is subjected to a compositional analysis to confirm if the relationships specified above are satisfied.

For instance, when a carbonate is used as a source material, carbon dioxide is produced by the thermal decomposition. Using a hydroxide causes the generation of water upon the thermal decomposition.

When the heating temperature is less than 700° C., carbon dioxide or water can not be fully removed from the material, thereby reducing the efficiency of the waste water treatment. On the other hand, when the heating temperature is far above 1000° C., thermal decomposition products having low melting points melt and the efficiency of the waste water treatment is also reduced. In order to avoid such unfavorable situations, it is necessary to fully remove the ignition loss components, like carbon dioxide or water by repeating the thermal decomposition process or in some cases, the remaining carbon should be removed by heating so that the total content of CaO, MgO and SiO$_2$ of the thermal decomposition product falls within the relationships specified above.

Examples of the salts used in the present invention include anhydrides or hydrates of iron salts such as ferrous chloride, ferric chloride, ferrous bromide, ferric bromide, ferrous nitrate, ferric nitrate, ferrous sulfate and ferric sulfate; and anhydrides or hydrates of magnesium salts, for example, magnesium chloride, magnesium bromide, magnesium nitrate and magnesium sulfate. Among these metal salts, ferrous or ferric chlorides, ferrous or ferric sulfate, magnesium chloride and magnesium sulfate are particularly preferable. The metal salts preferably have the same particle size as that of the above-mentioned CaO-MgO-SiO$_2$ system compound.

The treating process of the present invention is especially suitable for treating waste water containing an emulsion or latex having a resin content of 0.05 to 6 wt. %. In practicing the present invention, the CaO-MgO-SiO$_2$ system compound or the mixed composition of the CaO-MgO-SiO$_2$ system compound and one or more metal salts selected from iron salts and magnesium salts is added as a waste water treating agent in a powder form or slurry state into the emulsion or latex-containing waste water under stirring. The addition amount of the treating agent may be varied depending on the kind, composition, and concentration of the resin constituents in the waste water to be treated and the kind and content of emulsifiers. Usually, the addition of the foregoing waste water treating agent is increased when the resin content is high, but, in view of the state of the waste water after the clarification treatment, the addition amount should be properly determined. Practically, the addition of the CaO-MgO-SiO$_2$ system compound or the mixture of the CaO-MgO-SiO$_2$ system compound and the metal salt or salts selected from iron salts an magnesium salts is from 0.15 to 1.5 times, preferably not exceeding 0.7 times, relative to the weight of the resin constituents present in the waste water.

The addition of the invention waste water treating agent may be conducted either in a batch process or in a continuous process.

When the waste water treating agent is a mixture of the thermal decomposition product consisting of CaO-MgO-SiO$_2$ system compound and the metal salt or salts selected from iron salts and magnesium salts, the mixing ratio of CaO-MgO-SiO$_2$ compound : metal salt may be in the range of 2:1 to 1:3. The mixing ratio should be varied properly depending upon the kind and concentration of the emulsion or latex.

The waste water treating agent thus prepared is added to waste water containing resin constituents and stirred for a certain period, thereby causing the adsorption of the resin constituent onto the surface of the solid powder of the waste water treating agent and coagulation. Since the thus formed coagulum has a good settleability and separability, the treated waste water can be readily separated into a completely clear or almost colorless supernatant part and a lower part containing a high content of resin constituents by leaving the treated waste water to stand for a short period. The lower part is filtered by a conventional filtering method. The filtrate obtained is in a colorless and clear state or almost in such a state.

As an industrial filtering process, various filters or centrifugal separators may be used.

The supernatant and filtrate obtained after the above treatment can be discarded, after pH adjustment in some cases. However, when the content of the resin constituents of the waste water containing emulsion or latex is high, the pH of the waste water is again adjusted to neutrality and then the waste water treating agent is added to the neutralized waste water. The same treating procedure as described above is repeated. The thus treated supernatant and the filtrate are colorless and clarified and the COD value can be greatly reduced as compared with the waste water before treatment. When the waste water further contains phosphorus and/or nitrogen compounds, these constituents are also considerably reduced by the treatment of the present invention. The above filtration may be also conducted without separating the waste water into the foregoing two parts by leaving it to stand, depending on the kind of emulsion or latex or the resin content.

On the other hand, the coagulum can be easily filtered, since the waste water treating agent of the present invention has an effect in preventing consolidation and blocking. Further, the water content in the coagulum is reduced and subsequent operations can be conducted without any problem.

The dispersion of the CaO-MgO-SiO$_2$ system compound in the waste water prevents the resin constituents from sticking onto the waste water treatment facilities, such as stirrer tank, tank filter, pipes, etc.

The pH of the emulsion- or latex-containing waste water is usually about 7 and the resin and emulsifier constituents are stably dispersed through the waste water. The emulsion or latex consists of very fine particles having a size of about 0.1 to 5 μm and, when such particles exist at an amount of 30 ppm or more in the waste water, the waste water become a turbid white liquid. When the waste water treating agent of the invention consisting of the thermal decomposition product composed of $CaO$-$MgO$-$SiO_2$ system compound or the mixture of that compound and the metal salt(s) selected from iron salts and magnesium salts is added into such a turbid white waste water, the treating agent effectively acts as a flocculant for the fine particles of the emulsion or latex, which make the waste water turbid white, and forms large coagulums (flocks). The formed flocks have a higher specific gravity than the waste water due to the presence of the waste water treating agent having a specific gravity of 2.0 or greater and such a higher specific gravity is advantageous in that the sedimentation of the flocks is accelerated and, at the same time, the clarification of the supernatant of the treated waste water is improved.

Further, since the flocks formed as mentioned above are large, filtration is easily conducted.

When the $CaO$-$MgO$-$SiO_2$ system compound is added together with the metal salt(s), the growth and the formation rate of flocks are increased due to the synergistic effect of the coexistence of the two components, as compared with the $CaO$-$MgO$-$SiO_2$ system compound alone. Further, the sedimentation rate is also increased and clarification of the supernatant is further improved.

The waste water becomes alkaline (pH of 10 or higher) due to the addition of the $CaO$-$MgO$-$SiO_2$ system compound.

When the mixing ratio of the iron salts and/or magnesium salts to the $CaO$-$MgO$-$SiO_2$ system compound is increased, the pH of the waste water may be maintained neutral depending on the kind of the metal salt or salts that is used and the neutralizing step of the waste water can be omitted.

While the detailed mechanism of the purification process of the present invention is not fully understood, it is believed that the emulsified state of the resin constituents, which are the principal components of the emulsion or latex and are stably dispersed in the waste water, is destroyed when the waste water treating agent (i.e., $CaO$-$MgO$-$SiO_2$ system compound or the mixture of the $CaO$-$MgO$-$SiO_2$ system compound and the metal salt or salts selected from iron salts and magnesium salts) is added, and the resin constituents are adsorbed onto particles of the waste water treating agent and are coagulated. The emulsifier, which is a kind of surfactant used in a small amount in the emulsion or latex, is simultaneously adsorbed onto the waste water treating agent particles and thereby the destruction of the emulsified state of the resin particles is further accelerated and the coagulation of the resin constituents is also promoted. As a result, it is considered that larger flocks are formed and sedimentation is accelerated.

Figure 1:
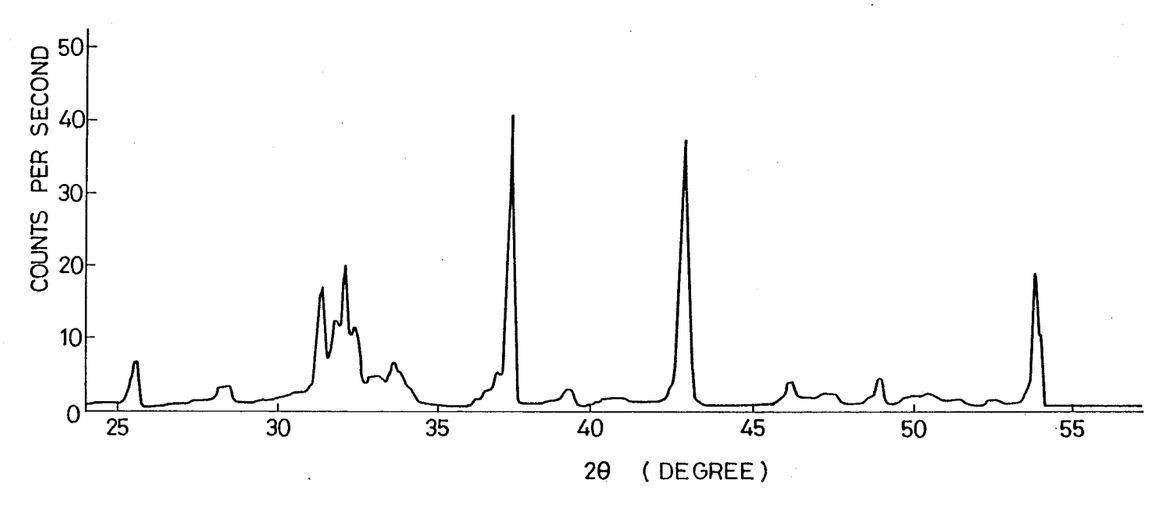
The single drawing is an X-ray diffraction diagram of the thermal decomposition product consisting of $CaO-MgO-SiO_2$ system compound prepared in Example 1 according to the present invention.

The powder of the $CaO$-$MgO$-$SiO_2$ compound used in Example 1 of the present invention was subjected to X-ray diffraction analysis. As will be noted from the attached drawing the resulting X-ray diffraction pattern consisted mainly of broad diffraction lines of $CaO$, $MgO$ and $SiO_2$ and other broad diffraction lines were also confirmed.

The untreated emulsion or latex-containing waste water, as set forth above, was brought to a pH value of 11.0 by adding NaOH and allowed to stand for a long time. Neither change in the turbidity nor agglomeration of the resin constituents was detected.

Further, only the metal salt or salts selected from the iron salts and magnesium salts used in the present invention was added in a certain amount to the untreated waste water. After stirring the waste water, it was allowed to stand for a long time. Neither turbidity change nor agglomeration of the resin constituents was detected.

Now, the present invention will be more clearly explained by referring to the following examples. Percentages given below are all percentages by weight unless otherwise indicated.

EXAMPLE 1

Waste water containing acrylonitrile-butadiene-styrene latex discharged from N company was diluted with water so as to adjust the resin content to 1%. 1000 liters of the resulting turbid white waste water was placed in a conical beaker and 5g of $CaO$-$MgO$-$SiO_2$ system compound prepared as described hereinafter was added to the waste water under agitation and agitated for one hour at room temperature. Then, the waste water was filtered using a filter paper A and the resultant colorless clear filtrate was analyzed for the pH, COD, T-N (total nitrogen content) and $P_2O_5$. The results are given in Table 1.

The used $CaO$-$MgO$-$SiO_2$ system compound was prepared as follows:

1000 g of natural dolomite ore and 300g of pulverized imported coal were mixed and heated at 810° C. for one hour in an electric furnace. The resultant mixture was finely ground by a test mill until all of the solids passed through standard sieves having pores of 149 μm. The compositional analysis showed that the ground compounds consisted of 54.3% of $CaO$, 36.3% of $MgO$ and 2.6% of $SiO_2$.

The drawing is the X-ray diffraction diagram of the $CaO$-$MgO$-$SiO_2$ system compound.

The COD value was measured in terms of oxygen demand (COD Mn) using potassium permanganate at 100° C. in accordance with the testing method specified in Japanese Industrial Standard (JIS) K102 "Testing Methods for Industrial Waste-Water".

The T-N value was measured by a coulometric titration type digital analyzer for measuring total nitrogen (Model TN-02 manufactured by Mitsubishi Chemical Industries, Ltd.).

The $P_2O_5$ value was measured using a spectrophotometer (Model 220A by Hitachi, Ltd.) in accordance with the method for measuring total phosphorus (by means of decomposition of perchloric acid and nitric acid) specified in subsection 46.3.1 of JIS K102 "Testing Methods for Industrial Waste-Water".

EXAMPLES 2 and 3

Further experiments were carried out in the same way as described in Example 1 except that the latex-containing waste water was diluted with water so as to give resin contents of 3.0% (Example 2) and 6.0% (Example 3), respectively, and the $CaO$-$MgO$-$SiO_2$ system compound was added in amounts of 10g (Example 2) and 15 g (Example 3). Both Examples 2 and 3 gave a clear colorless filtrate and the test results are shown in Table 1.

EXAMPLE 4

A waste water treating system in which two treatment tanks, 45 cm in diameter, 45 cm in height and 60 liters in effective volume, each having a stirrer, arranged in series, was employed for the following waste water treatment. The latex-containing waste water as described in Example 1 was diluted with water to bring the resin content to 2.0%. The resulting turbid white waste water was continuously fed at a rate of 2 liters/min to the first treatment tank. 200 g of CaO-MgO-SiO$_2$ system compound which was prepared in the same manner as set forth in Example 1 was added to 1000 ml of the above-mentioned waste water having the resin content of 2.0%, under agitation. The resultant slurry (content of CaO-MgO-SiO$_2$ system compound: 21 g/100 ml) was continuously fed at a rate of 116 ml/min to the first treatment tank. The treated waste water discharged from the second treating vessel of the water treating system was received into a 200 ml measuring cylinder and allowed to stand for 30 minutes. The resulting supernatant was tested for the pH, COD, T-N and P$_2$O$_5$ by the same testing procedures as set forth in Example 1. The test results are shown in Table 1.

COMPARATIVE EXAMPLE 1

100 g of CaC03, 100g of Mg(OH)$_2$ and 30 g of silica, which were all reagents commercially available from Ishizu Pharmaceutical Co., Ltd., were mixed, heated at 600° C. for a period of one hour in an electric furnace and finely ground using a test mill to pass through standard sieves having openings of 149 μm. The ground product was analyzed to determine the composition and the following result was obtained.

CaO:28.1%, MgO:34.7%, SiO$_2$:15.0%,
ignition residue:23.2%.

1000 ml of the latex-containing waste water used in Example 1 was treated by the same procedure as set forth in Example 1 except that 10g cf the thus obtained CaO-MgO-SiO$_2$ system compound was added to the waste water. The resulting filtrate had a turbid white liquid and the COD, T-N and P$_2$O$_5$ are shown in Table 1.

TABLE 1

| | | Example No. | | | | Comparative Example |
|---|---|---|---|---|---|---|
| | | 1 | 2 | 3 | 4 | 1 |
| Waste water before treatment | | | | | | |
| Analytical values (ppm) | COD | 6,860 | 7,350 | 13,100 | 7,230 | 6,860 |
| | T-N | 800 | 810 | 1280 | 890 | 800 |
| | P$_2$O$_5$ | 39.3 | 102 | 201 | 35.3 | 39.3 |
| | pH | 7.1 | 6.6 | 6.4 | 6.9 | 7.1 |
| | Color | Turbid white | | | | Turbid white |
| Filtrate or supernatant after treatment | | | | | | |
| Analytical value (ppm) | COD | 240 | 210 | 450 | 160 | 3,420 |
| | T-N | 68 | 155 | 360 | 72 | 580 |
| | P$_2$O$_5$ | 4.1 | 23.3 | 52.7 | 3.4 | 36.1 |
| | pH | 11.3 | 10.2 | 9.9 | 11.0 | 10.5 |
| | Color | Colorless and Clear | | | | Turbid white |
| Removability (%) | COD | 96.5 | 97.1 | 96.6 | 97.8 | 50.1 |
| | T-N | 91.5 | 80.9 | 71.9 | 91.9 | 27.5 |
| | P$_2$O$_5$ | 89.6 | 77.1 | 73.8 | 90.4 | 8.1 |

EXAMPLES 5 to 12

Waste water containing the respective emulsions or latexes shown in Table 2 were diluted with water so that the resin content of each waste water was adjusted to 1.0%. To 1000 ml of the waste water, 5g of the CaO-MgO-SiO$_2$ system compound used in Example 1 was added under agitation and agitated at room temperature for a period of one hour.

Each filtrate obtained as set forth in Example 1 was measured for the COD and the results are given in Table 2.

EXAMPLE 13

5 g of CaO-MgO-SiO$_2$ compound prepared as described below was added to waste water containing an emulsion shown in Table 2 under agitation and agitated at room temperature for a period of one hour. The COD of the filtrate of the treated waste water is shown in Table 2.

In order to prepare the CaO-MgO-SiO$_2$ system compound used in the above treatment process, 100 g of imported natural dolomite ore and 11 g of pulverized silica were mixed and heated at 750° C. over a period of one hour. The thus obtained compound was ground to pass through standard sieves having openings of 149 μm and analyzed to determine the composition. The result was as follows:

CaO:48.9%, MgO:33.3% and SiO$_2$:17.8%

COMPARATIVE EXAMPLE 2

100 g of CaCO$_3$ and 150 g of MgCO$_3$ which were reagents commercially available from Ishizu Pharmaceutical Co., Ltd., and 100g of fly ash (SiO$_2$: 60%, Al$_2$O$_3$:30% and CaO:5%) from a power station were mixed, heated at 1200° C. for a period of one hour in an electric furnace and finely ground using a small-sized mill to pass through standard sieves having openings of 149 μm. The ground product was analyzed to determine the composition and the following result was obtained.

CaO:26.2%, MgO:31.6%, SiO$_2$:26.5%.

1000 ml of the emulsion-containing waster water used in Example 5 was treated by the same procedure as set forth in Example 5 except that 5 g of the thus obtained CaO-Mgo-SiO$_2$ system compound was added to the waste water. The resulting filtrate had a measured value of COD of 510 ppm and was a turbid white liquid.

TABLE 2

| Example No. | Emulsion or latex | Waste Water *1 COD (ppm) | Filtrate *2 COD (ppm) | Removability (%) |
|---|---|---|---|---|
| 5 | styrene emulsion | 850 | 36 | 95.8 |
| 6 | urethane emulsion | 6160 | 910 | 85.2 |
| 7 | chloroprene latex | 970 | 210 | 78.4 |
| 8 | butadiene latex | 14600 | 29 | 99.8 |
| 9 | styrene-butadiene latex | 5610 | 140 | 97.5 |
| 10 | acrylonitrile-butadiene latex | 9630 | 85 | 99.1 |
| 11 | styrene emulsion*3 | 810 | 46 | 94.3 |

TABLE 2-continued

| Example No. | Emulsion or latex | Waste Water *1 COD (ppm) | Filtrate *2 COD (ppm) | Removability (%) |
|---|---|---|---|---|
| 12 | styrene-acrylic ester-vinyl acetate emulsion | 750 | 220 | 70.7 |
| 13 | styrene-acrylic ester-vinyl acetate emulsion | 750 | 240 | 68.0 |
| Comparative Example 2 | styrene emulsion | 850 | 510 | 60.0 |

*note
[1] Examples 5 to 13 and Comparative Example 2: turbid white liquid
[2] Examples 5 to 13: Colorless and clear liquid Comparative Example 2: Turbid white liquid
[3] styrene-α-methylstyrene emulsion

EXAMPLE 14

1000 ml of a turbid white waste water containing an acrylonitrile emulsion discharged from N company was placed in a conical beaker and a mixture consisting of 5 g of the $CaO$-$MgO$-$SiO_2$ system compound prepared in Example 1 and 5 g of ferrous sulfate of $FeSO_4.7H_2O$ was added under agitation and agitated at room temperature for a period of 30 minutes. Then, the waste water was filtered using a filter paper A and the resultant colorless clear filtrate was tested for the pH, COD and T-N as set forth in Example 1.

The test results are shown in Table 3.

The resin content of the acrylonitrile emulsion in the waste water before the treatment was 1%.

EXAMPLE 15 to 19

The procedure described in Example 14 was repeated except that the ferrous sulfate reagent: $FeSO_4.7H_2O$ was replaced by 5 g of ferrous chloride ($FeCl_2.nH_2O$), ferric sulfate [$Fe(SO_4)_3.7H_2O$], ferric chloride ($FeCl_3.6H_2O$), magnesium sulfate ($MgSO_4$) and magnesium chloride anhydride ($MgCl_2$), respectively, in Examples 15 to 19 and the agitation time was changed to 40 minutes. The resulting filtrates were all colorless and clear and the results are shown in Table 3.

COMPARATIVE EXAMPLE 3

$CaO$-$MgO$-$SiO_2$ system compound was prepared as follows.

100 g of $CaCO_3$, 100 g of $Mg(OH)_2$ and 30 g of silica, all reagents by Ishizu Pharmaceutical Co., Ltd., were mixed, heated at 600° C. for a period of one hour in an electric furnace and finely ground to pass through standard sieves having openings of 149 μm, using a test mill. The component analysis of the ground product showed the following result.

$CaO$:28.1%, $MgO$:34.7%, $SiO_2$:15.0%, ignition residue: 23.2%.

The same treatment procedure as described in Example 14 was repeated except that 10 g of a mixed composition consisting of 5 g of the above $CaO$-$MgO$-$SiO_2$ system compound and 5 g of ferrous sulfate was used as a treating agent. The resulting filtrate was a white turbid liquid and the analytical results are shown in Table 3.

TABLE 3

| No. | | Example | | | | | | Comparative Example |
|---|---|---|---|---|---|---|---|---|
| | | 14 | 15 | 16 | 17 | 18 | 19 | 3 |
| Waste water before treatment | | | | | | | | |
| Analytical Values (ppm) | COD | 1650 | 1650 | 1650 | 1650 | 1650 | 1650 | 1650 |
| | T-N | 6350 | 6350 | 6350 | 6350 | 6350 | 6350 | 6350 |
| pH | | 7.6 | 7.6 | 7.6 | 7.6 | 7.6 | 7.6 | 7.6 |
| Color and state | | Turbid white | | | | | | Turbid white |
| Addition of $CaO$-$MgO$-$SiO_2$ compound (g) | | 5.0 | 5.0 | 5.0 | 5.0 | 5.0 | 5.0 | 5.0 |
| Addition of iron salt or magnesium salt (g) | | 5.0 | 5.0 | 5.0 | 5.0 | 5.0 | 5.0 | 5.0 |
| Filtrate after treatment | | | | | | | | |
| Analytical values (ppm) | COD | 440 | 470 | 450 | 460 | 530 | 540 | 790 |
| | T-N | 310 | 310 | 340 | 310 | 350 | 340 | 2150 |
| pH | | 12.7 | 12.6 | 12.2 | 12.1 | 12.3 | 10.6 | 12.5 |
| Color | | Colorless and clear | | | | | | Turbid white |
| Removability (%) | COD | 73.3 | 71.5 | 72.7 | 72.1 | 67.9 | 67.2 | 52.1 |
| | T-N | 95.1 | 95.1 | 94.6 | 95.1 | 04.5 | 04.6 | 66.1 |

EXAMPLES 20 and 21

A waste water containing an ethylene-vinyl acetate emulsion resulting from the manufacturing procedure of ethylene-vinyl acetate emulsion in S company was diluted with city water so that the resin content of the waste water was adjusted to 3.0% (Example 20) and 6.0% (Example 21). The waste waters were treated in the same way as described in Example 14 except that the mixing ratio of the $CaO$-$MgO$-$SiO_2$ system compound to the ferrous sulfate $FeSO_4.4.5H_2O$ was changed to 1:0.4 in both waste waters and the addition amount of the mixture was changed to 15 g (Example 20) and 25 g (Example 21). The resultant filtrates were colorless and clear and the results are shown in Table 4.

EXAMPLES 22 AND 23

Waste water containing a low acrylonitrile-butadiene latex (Example 22) or a vinyl chloride emulsion (Example 23) was diluted with city water to adjust the resin content to 1.0% and 5 g of the mixture of the $CaO$-$MgO$-$SiO_2$ system compound and ferrous sulfate $FeSO_4.7H_2O$ in the mixing ratio of 1:1 used in Example 14 was added to 1000 ml of each waste water under stirring and stirred at room temperature for a period of one hour. Then, the filtrates obtained as set forth in Example 14 were examined and the analytical results are shown in Table 4.

TABLE 4

| Example No. | Resin in latex or emulsion | Waste water before treatment COD (ppm) | pH | Filtrate after treatment COD (ppm) | pH | COD Removability (%) |
|---|---|---|---|---|---|---|
| 20 | Ethylene vinyl-acetate | 2130 | 7.2 | 420 | 13.0 | 80.3 |
| 21 | Ethylene vinyl-acetate | 2770 | 7.0 | 810 | 13.0 | 70.8 |
| 22 | Low AN-BD*1 | 8240 | 8.6 | 1240 | 12.6 | 85.0 |
| 23 | Vinyl chloride | 150 | 7.6 | 18 | 12.5 | 88.0 |

Waste Waters were all turbid white liquids and the filtrates all became colorless and clear.
*Low acrylonitrile-bitadiene type

EXAMPLES 24 to 26

The treatment procedure described in Example 16 was repeated except that the mixing ratio of the CaO-MgO-SiO$_2$ compound and ferric sulfate was changed as shown in Table 5. The resulting filtrates were colorless and clear and the results are shown in Table 5.

EXAMPLE 27

6 g of a mixed composition consisting of the CaO-MgO-SiO$_2$ system compound used in Example 16 and ferric sulfate in the mixing ratio of 1:2 was added under stirring to 1000 ml of a waste water containing a styrene-acrylate ester-vinyl acetate emulsion discharged from K company and stirred at room temperature for a period of 10 minutes. The waste water was allowed to stand for 10 minutes and a colorless clear supernatant was obtained. The pH and COD of the colorless clear filtrate were measured. The results are shown in Table 5.

TABLE 5

| | Example No. | | | |
|---|---|---|---|---|
| | 24 | 25 | 26 | 27 |
| Resin in latex or emulsion | Acrylo-nitrile | Acrylo-nitrile | Acrylo-nitrile | Styrene-acrylic-ester-vinyl acetate |
| Waste water before treatment | | | | |
| COD (ppm) | 1650 | 1650 | 1650 | 600 |
| pH | 7.6 | 7.6 | 7.6 | 7.7 |
| Color | Turbid white | | | |
| Addition of CaO-MgO-SiO$_2$ compound (g) | 6 | 3 | 3 | 2 |
| Addition of Iron salt (g) | 4 | 6 | 7 | 4 |
| Filtrate after treatment | | | | |
| COD (ppm) | 470 | 350 | 420 | 180 |
| pH | 13.0 | 10.3 | 8.8 | 6.7 |
| Color | Colorless and clear | | | |
| COD removability (%) | 71.2 | 78.8 | 74.5 | 70.0 |

EXAMPLE 28

6 g of the mixed composition consisting of the CaO-MgO-SiO$_2$ system compound used in Example 14 and ferrous sulfate in the mixing ratio of 1:1 was added under stirring to 1000 ml of waste water containing an acrylonitrile-butadiene-styrene latex discharged from U company and stirred at room temperature for a period of 30 minutes. The waste water was allowed to stand for 30 minutes and a colorless clear supernatant was obtained. The pH, COD, T-N and P$_2$O$_5$ of the resultant colorless and clear supernatant and filtrate were measured. The results are shown in Table 6.

TABLE 6

| | | Example 28 |
|---|---|---|
| Waste water before treatment | | |
| Analytical values (ppm) | COD | 3,520 |
| | T-N | 410 |
| | P$_2$O$_5$ | 20.0 |
| pH | | 7.1 |
| Color and state | | Turbid white |
| Filtrate or Supernatant after treatment | | |
| Analytical values (ppm) | COD | 390 |
| | T-N | 65 |
| | P$_2$O$_5$ | 2.0 |
| pH | | 11.9 |
| Color and state | | Colorless and clear |
| Removability (%) | COD | 88.9 |
| | T-N | 84.1 |
| | P$_2$O$_5$ | 90.0 |

As described above, when the thermal decomposition product consisting of CaO-MgO-SiO$_2$ system compound or a mixture of such a CaO-MgO-SiO$_2$ system compound and at least a metal salt selected from iron salts and/or magnesium salts was added to waste water containing an emulsion or latex, the resin constituents of the emulsion or latex which are the source materials of the turbidity of the waste water are coagulated and removed from the waste water. The remaining waste water is a clear liquid and, at the same time, the COD, T-N, P$_2$O$_5$ constituents can be very effectively removed.

Further, the coagulum produced by the present invention is superior in settleability and removability and the formation of sludge is minimized. Therefore, subsequent treatments are facilitated and the waste water treating agent of the present invention is highly valuable for industrial applications.

What is claimed is:

1. A process for treating waste water containing one or more latexes or emulsions of synthetic resin particles in order to remove the synthetic resin particles, which comprises the steps of: adding to and mixing in said waste water a CaO-MgO-SiO$_2$ treatment agent which has been prepared by heating, at a temperature in the range of from 700° C. to 1000°C., a mixture of (1) dolomite which is thermally decomposed to form CaO and MgO at said temperature and (2) SiO$_2$-containing substance, mixed in proportions such that the weight ratio of CaO/MgO in said treatment agent is greater than 1, the weight ratio of MgO/SiO$_2$ in said treatment agent is greater than 1, and the sum of CaO, MgO and SiO$_2$ in said treatment agent is greater than 80 weight %, whereby to cause coagulation and sedimentation of said synthetic resin particles to form flocs, and then separating said flocs from the remainder of the treated waste water.

2. A process for treating waste water as claimed in claim 1 in which said one or more emulsions or latexes are selected from the group consisting of vinyl acetate emulsion, acrylic ester emulsion, styrene emulsion, chloroprene latex, ethylene vinyl acetate emulsion, urethane emulsion, butadiene latex, vinyl choloride emulsion, acrylonitrile emulsion, styrene-butadiene latex, acrylonitrile-butadiene latex, styrene-acrylonitrile emulsion, acrylonitrile-butadiene-styrene latex, styrene-acrylic ester-vinyl acetate emulsion and natural rubber latex.

3. A process as claimed in claim 1 in which the weight ratio of CaO/MgO in said treatment agent is greater than 1.2, the weight ratio of MgO/$SiO_2$ in said treatment agent is greater than 1.2, and the sum of CaO, MgO and $SiO_2$ in said treatment agent is greater than 90 weight %.

4. A process as claimed in claim 1 in which said treatment agent contains about 48.9% by weight of CaO, about 33.3% by weight of MgO and about 17.8% by weight of $SiO_2$.

5. A process as claimed in claim 1 in which said treatment agent has a particle size of not greater than 149 micrometers.

6. A process as claimed in claim 1 in which the amount of said treatment agent added to said waste water is from 0.15 to 1.5 times the weight of the synthetic resin particles in said waste water.

7. A process for treating waste water containing one or more latexes or emulsions of synthetic resin particles in order to remove the synthetic resin particles, which comprises the steps of: adding to and mixing in said waste water a mixture of (A) at least one metal salt selected from the group consisting of iron salts and magnesium salts, and (B) a CaO-MgO-$SiO_2$ treatment agent which has been prepared by heating, at a temperature in the range of from 700° C. to 1000° C., a mixture of () dolomite which is thermally decomposed to form CaO and MgO at said temperature and (2) $SiO_2$-containing substance, mixed in proportions such that the weight ratio of CaO/MgO in said treatment agent is greater than 1, the weight ratio of MgO/$SiO_2$ in said treatment agent is greater than 1, and the sum of CaO, MgO and $SiO_2$ in said treatment agent is greater than 80 wight %, whereby to cause coagulation and sedimentation of said synthetic resin particles to form flocs, and then separating said flocs from the remainder of the treated waste water.

8. A process for treating waste water as claimed in claim 7 in which said metal salt is at least one selected from the group consisting of ferrous sulfate, ferric sulfate, ferrous chloride, ferric chloride, magnesium sulfate and magnesium chloride.

9. A process for treating waste water as claimed in claim 7 in which said one or more emulsions or latexes are selected from the group consisting of vinyl acetate emulsion, acrylic ester emulsion, styrene emulsion, chloroprene latex, ethylene vinyl acetate emulsion, urethane emulsion, butadiene latex, vinyl chloride emulsion, acrylonitrile emulsion, styrene-butadiene latex, acrylonitrile-butadiene latex, styrene-acrylonitrile emulsion, acrylonitrile-butadiene-styrene latex, styrene-acrylic ester vinyl acetate emulsion and natural rubber latex.

10. A process as claimed in claim 7 in which the weight ratio of Cao/MgO in said treatment agent is greater than 1.2, the weight ratio of MgO/$SiO_2$ in said treatment agent is greater than 1.2, and the sum of CaO, MgO and $SiO_2$ in said treatment agent is greater than 90 weight %.

11. A process as claimed in claim 7 in which said treatment agent contains about 48.9% by weight of CaO, about 33.3% by weight of MgO and about 17.8% by weight of $SiO_2$.

12. A process as claimed in claim 7 in which said treatment agent and said metal salt have particle sizes of not greater than 149 micrometers.

13. A process as claimed in claim 7 in which the weight ratio of (B)/(A) is from 2/1 to 1/3.

14. A process as claimed in claim 13 in which the amount of the mixture of (A) and (B) added to said waste water is from 0.15 to 1.5 times the weight of the synthetic resin particles in said waste water.

* * * * *

UNITED STATES PATENT AND TRADEMARK OFFICE
CERTIFICATE OF CORRECTION

PATENT NO. : 4 966 714
DATED : October 30, 1990
INVENTOR(S) : Kouzou HIROSAWA et al It is certified that error appears in the above-identified patent and that said Letters Patent is hereby corrected as shown below:

Column 15, line 34; after "of" change "()" to ---(1)---.

Column 16, line  1; change "wight" to ---weight---.

line 22; change "Cao/MgO" to ---CaO/MgO---.

Signed and Sealed this

Fourth Day of August, 1992

Attest:

DOUGLAS B. COMER

*Attesting Officer*   *Acting Commissioner of Patents and Trademarks*